Figure 1:

Jan. 28, 1969            J. GÖTZE            3,424,586
SILVER HALIDE EMULSIONS SENSITIZED WITH CYANINE DYES
CONTAINING A HYDROXYPROPYL SULFONIC ACID RADICAL
Filed June 1, 1964

INVENTOR.
JOHANN GÖTZE.
BY Connolly and Stutz
his ATTORNEYS

United States Patent Office 3,424,586
Patented Jan. 28, 1969

3,424,586
SILVER HALIDE EMULSIONS SENSITIZED WITH CYANINE DYES CONTAINING A HYDROXY-PROPYL SULFONIC ACID RADICAL
Johannes Götze, Bergisch-Neukirchen, Germany, assignor to Agfa Aktiengesellschaft, Leverkusen, Germany, a corporation of Germany
Filed June 1, 1964, Ser. No. 371,250
Claims priority, application Germany, June 10, 1963, A 43,300
U.S. Cl. 96—106    7 Claims
Int. Cl. G03c 1/10

The invention relates to photographic silver halide emulsions optically sensitized with cyanine dyes at least one of the heterocyclic nitrogen atoms of which is substituted by a hydroxypropylsulfonic acid radical.

Cyanine dyes such as trimethine cyanines, the nitrogen atoms in the heterocyclic rings of which are substituted by alkyl radicals are suitable only for sensitizing silver halide emulsions which do not contain color couplers. The sensitizing action of these dyes are greatly diminished by the addition of color couplers to the silver halide emulsion so that the utility for such sensitizers is limited.

This disadvantage can be overcome by substituting at least one of the alkyl radicals by sulfo groups. The sensitizing effect of the resulting sensitizers is, however, often insufficient. Moreover, the decay of the sensitization curve of these sensitizing dyes is not steep enough towards longer wave length so that the dark room safety of such sensitizers does not meet requirements.

It is an object of the invention to provide new cyanine dyes at least one of the heterocyclic nitrogen atoms of which is substituted by a hydroxy propyl sulfonic acid group. Another object is to provide methods for making these cyanine dyes. Still another object is to provide photographic emulsions sensitized with these new cyanine dyes. Other objects will become apparent from a consideration of the following description and examples.

The above objects have been attained by providing cyanine dyes in particular trimethine cyanine dyes, more preferably mesosubstituted trimethine cyanines in which the nitrogen atoms of one or both heterocyclic rings are substituted by hydroxypropylsulfonic acid radicals. These dyes are excellent sensitizers for silver halide emulsion layers.

Particular utility is exhibited by trimethine cyanines which contain as heterocyclic radicals at least one benzthiazole nucleus the nitrogen atom of which is substituted with a hydroxypropylsulfonic acid radical. These sensitizers may be represented by the following formula I 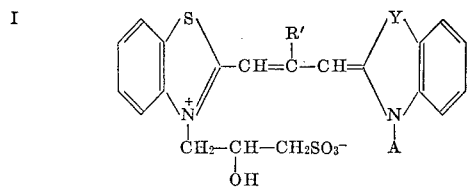

wherein

R'=lower alkyl, preferably up to 5 carbon atoms; more especially methyl or ethyl;
Y=S or Se,
A=lower alkyl radical preferably up to 5 carbon atoms, such as methyl, ethyl or propyl if Y stands for Se; A is a lower alkyl radical preferably up to 5 carbon atoms such as methyl, ethyl or propyl or a hydroxypropylsulfonic acid group of the formula $$-CH_2-CH-CH_2-SO_3H$$
$$\quad\;\;\;|$$
$$\quad\;\;\;OH$$

or a salt of this group with any cation such as cations of alkali metal or ammonium, if Y stands for S. The chemical nature of the cation is not critical.

The benzene rings of the sensitizing dyes in particular the fused benzene rings of the heterocyclic groupings can be substituted with one or more substituents such as alkyl, in particular lower alkyl having up to 5 carbon atoms, such as methyl, ethyl or propyl, alkoxy groups containing up to 5 carbon atoms preferably methoxy, ethoxy or propoxy, halogen preferably chlorine or bromine, aryl, preferably phenyl, phenyl fused in the 4:5 or 6:7 position, cycloalkyl such as cyclohexyl, phenyl alkyl, such as benzyl or phenylethyl, or heterocyclic groupings such as thienyl in the 5- and/or 6-position.

Starting materials for the preparation of the new dyestuffs are, for example, benzthiazole quaternary salts of the formula II 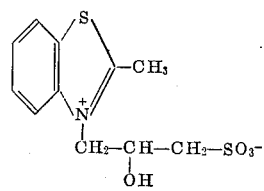

Such quaternary salts may be prepared as follows: Epichlorohydrin is, as known from the literature (Ber. 61 (1928) page 1354), reacted in a simple manner with acid sodium sulfite or pyrosulfite to form the alkaline salt of 3-chloro-2-hydroxypropane sulfonic acid. The free acid is obtained from the aqueous solution of this salt by using an ion exchange column. After evaporation of the water in vacuo, this free acid is present as semi-solid substance.

The 3-chloro-2-hydroxypropane-1-sulphonic acid is reacted with 2-methylbenzthiazole or its derivatives substituted in the benzene nucleus (e.g. 2,5-dimethylbenzthiazole, 2,6-dimethylbenzthiazole, 2,5,6-trimethylbenzthiazole or 2-methyl-5-chlorobenzthiazole), hydrochloric acid being split off (the chlorohydrates of the benzthiazole bases may be isolated by sublimation) and the quarternary salts of Formula III are formed.

III 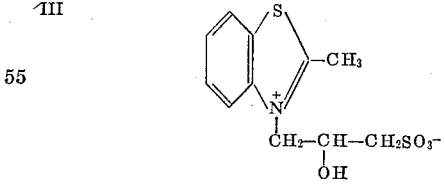

These quaternary salts III may be condensed with the usual intermediate products of cyanine chemistry, e.g., those of Formula IV as described, for example, in German Patent No. 917 330 or with ortho acid esters IV 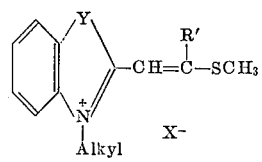

to form symmetrical or asymmetrical trimethine dyes, as will be explained more fully in the following examples.

The present invention includes sensitizing dyes which in principle correspond to Formul I, wherein, however the benzthiazole or benzselenazole groupings are replaced by other 5- or 6-membered heterocyclic rings which are usual in cyanine chemistry, for example, oxazoles, benzoxazoles, naphthoxazoles, oxazines, benzoxaines, thiazoles, naphthoselenazoles, thiodiazoles, oxadiazoles, imidazoles, benzimidazoles, pyrimidines, pyridines, quinolines, isoquinolines, thiazolines or indolenines.

Preferred, however, are sensitizing dyes according to Formula I, more particular those in which the benzene rings are unsubstituted or are substituted with methyl groups in the 5- and/or 6-position or chlorine atoms in the 5-position or in which further benzene nuclei are fused to the benzene rings of the heterocyclic groupings.

The sensitizing action is excellent both in black-and-white silver halide emulsions and in emulsions containing color couplers. By the term color couplers are understood couplers capable of reaction with oxidizing products of color-forming aromatic amino developers to form a dye. Color couplers can be present in the emulsion layer in the solved or emulsified form. The sensitization effect of the new dyes is mostly higher than that of the corresponding dyes in which the nitrogen atoms of the heterocyclic rings are substituted with a sulfo alkyl group.

The dyeing of the photographic layer is negligible.

Furthermore, the sensitizing dyes are advantageous since the dyes and the intermediate products can be prepared very simply and can easily be purified.

Silver halide emulsion layers which contain silver chloride, silver bromide or mixtures thereof and which might additionally contain up to 10 mol percent of silver iodide can be used as light-sensitive layers. Gelatine is preferred as binder for the light-sensitive layers, but this can be wholly or partially replaced by other layer-forming, hydrophilic colloids, depending upon the properties which are required. Suitable, for example, are polyvinyl alcohol, polyvinyl pyrrolidone, starch or starch ether, alginic acid and derivatives thereof such as salts particularly with alkali metals, esters or amides or carboxmethyl cellulose and the like.

The dyes of the present invention are advantageously incorporated in the washed and finished emulsion and should be uniformly distributed throughout the emulsion. The methods of incorporating the dyes in an emulsion are simple and well known to those skilled in the art of emulsion making. It is convenient to add the dyes from solution in appropriate solvents such as alcohols and phenols or in a mixture of those solvents with water. The solvent must be compatible with the emulsion and substantially free from any deleterious effect on the silver halide emulsion. Water or methanol or a mixture thereof has proven satisfactory as a solvent for the majority of the new dyes.

The concentration of the sensitizing dyes of the present invention in the silver halide emulsion can vary widely, for example, from about 2 to 200 mg. preferably 10 to 60 mg. per kg. of the emulsion. The concentration of the dye will vary according to the type of light-sensitive material in the emulsion and according to the facts desired. The suitable and optimal concentration for any given emulsion will be apparent to those skilled in the art upon making the ordinary tests customarily used in the art of emulsion making.

The dyestuffs are in addition particularly insensitive to other additives which are commonly used, for example, wetting agents, stabilisers, bactericides, fungicides, hardeners and developers added to the layer, and also to other additives, such as color couplers, in their water-soluble or emulsified form, and to other dyestuffs such as antihalo or filter dyes or in the silver-dye-bleach process, for example, azo dyestuffs. The dyes according to the invention are also suitable for the optical sensitization of electrophotographic semiconductor layers, more especially zinc oxide layers. The sensitizing dyes may also be used for emulsions intended for use in silver dye bleach processes.

The synthesis of the new quaternary salts serving as starting materials for the preparation of the dyes is described below:

(a) Preparation of chlorohydroxypropane sulfonic acid: A neutral solution of 150 g. of the sodium salt of 3-chloro-2-hydroxypropanesulfonic acid (according to Ber. 61 [1928] page 1354) in about 1 liter of water is run slowly through an ion exchange column to remove the cations from the solution. The column contains approximately 2000 cc. of a copolymer as described in British Patent No. 577,707, Example 1. The aqueous solution obtained is now acid. When all the sodium salt solution has run through the column, the column is washed with water until the water running off is neutral. The acid solutions collected are concentrated in vacuo (12 mm. mercury at a temperature of 75° C.) to a syrup which is dried over $P_2O_5$ and kept.

The substance contains 1 mol water of crystallisation which may be removed at about 150° C.

Analysis.—$C_3H_7O_4ClS.H_2O$; molecular weight 192.6. Calculated: C, 18.7%; H, 4.7%; O, 41.5%; S, 16.7%; Cl, 18.4%. Found: C, 18.4%; 4.9%; O, 41.7%; S, 15.6%; Cl, 18.0%.

(b) Preparation of 2-methyl-3-hydroxypropylsulfonic acid benzthiazolium betaine:

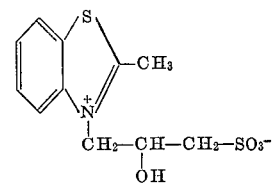

30 g. of 2-methylbenzthiazole mixed with 18 g. of chlorohydroxypropanesulfonic acid are heated in an oil bath for 45 minutes at 200–210° C. (temperature of the bath). At 150° C. internal temperature, water escapes and the temperature then rises to a maximum of 200° C. and benzthiazole chlorohydrate is sublimated. The liquid reaction mixture is decanted and mixed with alcohol. Crystals are formed which are removed by vacuum filtration and washed with acetone and ether. M.P. approx. 290° C.

Analysis.—$C_{11}H_{13}O_4NS_2$; mol. weight 287.3. Calculated: C, 46.0%; H, 4.5%; O, 22.3%; 4.9%; S, 22.3%. Found: C, 45.8%; H, 4.8%; O, 22.5%; N, 5.0%; 22.0%.

(c) Preparation of 2,5-dimethyl-3-hydroxypropylsulfonic acid benzthiazolium betaine:

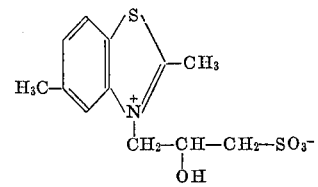

56 g. of 2,5-dimethylbenzthiazole and 30 g. of 3-chloro-2-hydroxypropane sulfonic acid are heated for one hour in an oil bath at 200° C. (temperature of the bath). The reaction proceeds as in (b). The product is worked up by treating the liquid reaction product several times with acetone. A viscous mass is obtained which is triturated with ethanol and thus becomes solid. M.P. approx. 270° C.

Analysis.—$C_{12}H_{15}O_4NS_2$. Calculated: N, 4.9%. Found: N, 4.6%.

(d) Preparation of 2,5,6-trimethyl-3-hydroxypropyl-sulfonic acid benzthiazolium betaine:

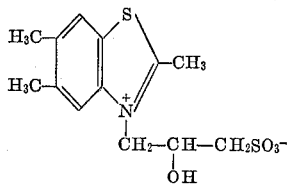

35 g. of 2,5,6-trimethylbenzthiazole and 17 g. of 3-chloro-2-hydroxypropanesulfonic acid are heated for 75 minutes at 190° C. (temperature of the bath). The reaction product is treated with acetone, thus solidifying. This product is dissolved in a small quantity of methanol, filtered and the filtrate is carefully precipitated with acetone, a white powder being formed.

*Analysis.*—$C_{13}H_{17}O_4NS_2$; molecular weight, 315. Calculated: N, 4.4%; S, 20.3%. Found: N, 4.6%; S, 20.2%.

Other benzthiazole bases are also quaternated in a similar way (see also Example 9).

Photographic example

A gelatin silver halide emulsion sensitized with one of the dyes of the present invention is prepared by the following procedure:

About 20–60 mg. of a dye of the present invention are dissolved in methanol and are added slowly to 1 kg. of a gelatino-silver-halide emulsion while stirring. The silver halides of the emulsion consists of silver bromide containing about 3 mol percent of silver iodide. The stirring is continued until the dye is uniformly distributed throughout the emulsion. The emulsion is cast onto a suitable support such as a sheetlike support of cellulose acetate, provided with a subbing layer and dried.

Photographic silver halide emulsions containing the sensitizing dyes of the present invention can also contain such addenda as chemical sensitizers, for example, sulfur sensitizers, various gold compounds such as potassium-chloroaurate or auric trichloride, various palladium compounds such as palladium chloride or mixtures of such sensitizers; antifoggants such as heterocyclic mercapto compounds, for example, phenyl-mercaptotetrazole, mercury compounds, such as described in U.S. Patents 2,728,663 and 2,728,665 or azaindolizines, such as described by Birr in Z. wiss. photo. vol. 47 (1952) pages 2 to 28.

A number of dyes of the present invention and their properties are described more fully hereinafter.

EXAMPLE 1

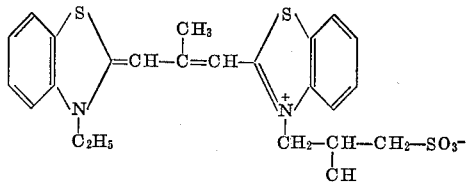

Preparation: 7.2 g. of compound

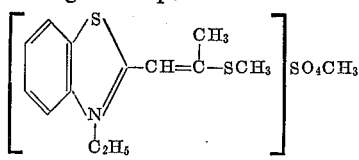

are dissolved in 30 cc. ethanol; 5.4 g. of the quaternary salt according to (b) are dissolved in a mixture of 20 g. phenol and 20 cc. hot ethanol. The two solutions are combined and treated at 50° C. with 4 cc. triethylamine. The reaction mixture is left to stand overnight at room temperature, the crude dye (6.5 g.) is suction-filtered, washed with alcohol and ether and crystallized twice from a mixture of methanol and chloroform. The dyestuff has a M.P. of 235–240° C. and an absorption maximum at 555 nm.

*Analysis.*—$C_{23}H_{24}O_4N_2S \cdot 3H_3O$. Calculated: C, 50.9%; H, 5.5%; N, 5.2%; S, 17.7%. Found: C, 50.6%, 50.8%; H, 5.5%, 5.7%; N, 5.4%, 5.6%; S, 17.8%.

Figure 3:
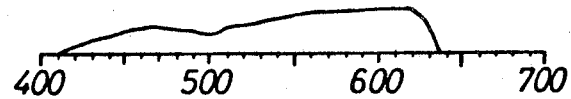

45 mg. of the above dye are added to 1 kg. of a silver halide gelatine emulsion, the silver halide of which consists of silver bromide containing about 2% of silver iodide. The speed of the emulsion was 17° DIN, the sensitization curve is shown in FIG. 3.

The above dye is compatible with other sensitizing dyes so that the sensitizing characteristic of the silver halide emulsion layer can be varied in accordance with the requirements of the reproduction process in which the emulsion is to be used.

EXAMPLE 2

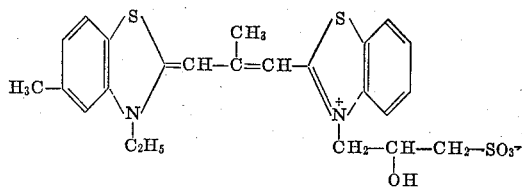

Preparation: 3.8 g. of compound

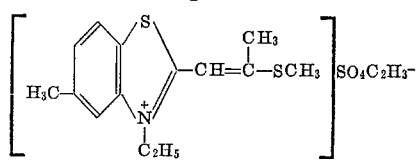

are dissolved in 20 cc. hot alcohol. 2.9 g. of the quaternary salt according to (b) are dissolved in 10 g. of phenol and 10 cc. of hot ethanol. The two solutions are filtered, combined and treated at about 45° C. with 2 cc. of triethylamine. The reaction mixture is left to stand overnight at room temperature, the crude dye (4 g.) is suction-filtered and recrystallized from a mixture of methanol and chloroform. M.P. 237–244° C.

When added to a fine grain silver bromo iodide gelatine emulsion in a quantity of 45 mg. per liter of emulsion, this dyestuff has a sensitization curve according to FIG. 1.

EXAMPLE 3

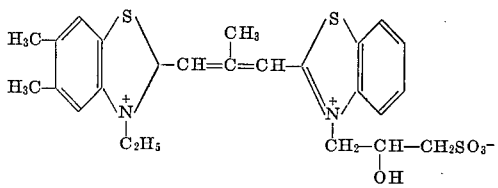

Preparation: 1.1 g. of the compound

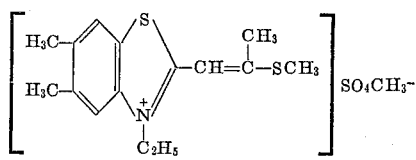

are dissolved in 20 cc. of hot ethanol, 0.8 g. of the quaternary salt according to (b) in 3 g. of phenol and 5 cc. of boiling alcohol. The combined and filtered solutions are treated at 45° C. with 1 cc. of triethylamine and kept at room temperature overnight. The crude dye (1 g.) is suction-filtered and recrystallized as described in the preceding examples. M.P. 288° C.

EXAMPLE 4

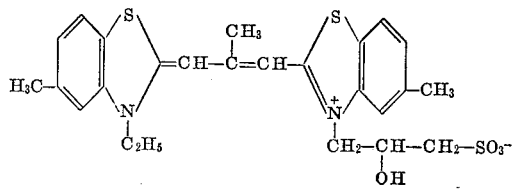

Preparation: 3.7 g. of compound

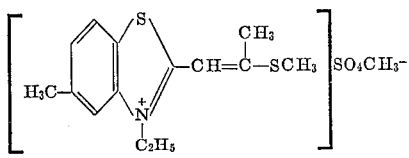

are dissolved in 30 cc. of hot ethanol, 3.0 g. of the salt according to (c) in 10 g. of phenol and 30 cc. of hot ethanol. 2.5 cc. of triethylamine are added at 50° C. to the combined and filtered solutions, the mixture kept at room temperature for 2 days and the precipitated dye (5 g.) suction-filtered and recrystallized from 100 cc. of methanol and 200 cc. of chloroform. M.P. 240° C.

Figure 2:
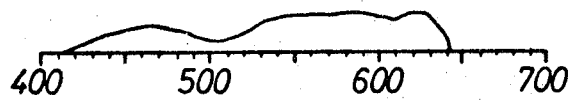

FIGURE 2 shows a sensitization curve of this dye. 45 mg. of the dyestuff were added to 1 kg. of a silver bromo iodide gelatine emulsion containing about 3 mol percent of silver iodide. The green sensitivity in addition to the equally good red sensitivity is excellent.

EXAMPLE 5

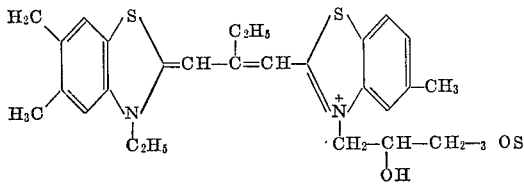

Preparation: 8 g. of compound

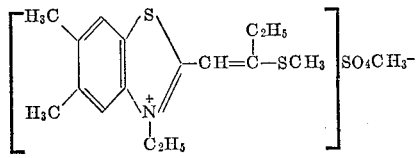

are dissolved in 50 cc. of ethanol 5.6 g. of the compound according to (c) in 20 g. of phenol and 30 cc. of ethanol. The combined and filtered solutions are treated with 2.5 cc. of triethylamine. After 24 hours, the crude dye (9 g.) is suction-filtered and recrystallized from a mixture of methanol and chloroform. M.P. 260- C.; absorption maximum: 565 millimicrons; Yield of the purified dye: 6 g.

45 mg. of this dye are added to a highly sensitive silver bromo iodide gelatine emulsion which in addition contains in an amount of 15 g. per kg. emulsion a blue green coupler of the oxynaphthoic acid-type of the following formula:

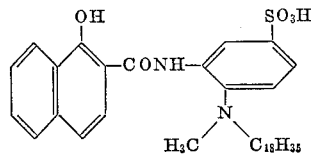

Figure 4:
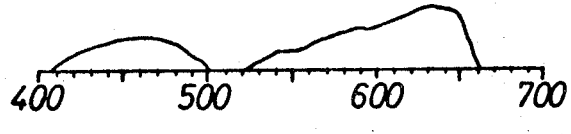

A sensitization curve according to FIGURE 4 is obtained.

EXAMPLE 6

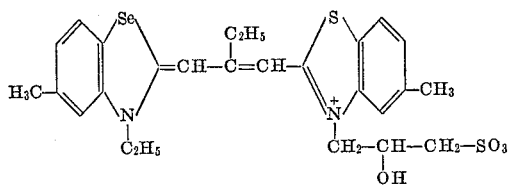

Preparation: 4.4 g. of compound

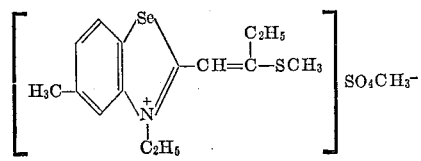

and 3.0 g. of the quaternary salt according to (c) are dissolved, as described in the preceding examples, in alcohol and phenol, treated with 2.5 cc. of triethylamine and worked up after 24 hours. 5 g. of the crude dyestuff are obtained. This is recrystallized by the usual method. M.P. approx. 200° C.; absorption maximum: 565 millimicrons.

Figure 5:
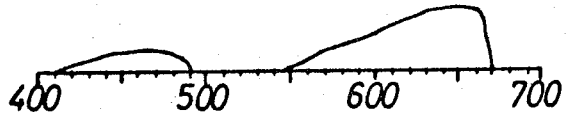

FIGURE 5 shows the sensitization curves obtained with a silver bromide gelatine emulsion which contains a color coupler as described in Example 5 and 50 mg. of the dye per kg. of the emulsion. The dye has good compatibility with other sensitizing dyes.

EXAMPLE 7

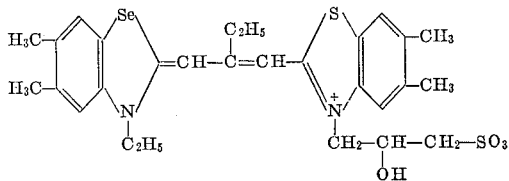

Preparation 4.5 g. of the compound

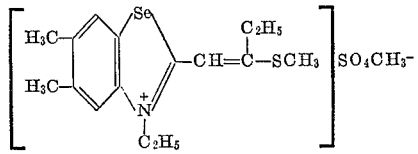

dissolved in 30 cc. of ethanol, 3.2 g. of the compound according to (d) dissolved in 50 cc. of ethanol and 10 g. of phenol are mixed, treated at 45° C. with 3 cc. of triethylamine and kept at room temperature for 24 hours. After recrystallization from a mixture of menthanol and chloroform, the purified dye had a melting point of 235° C. Absorption maximum 575 nm.

35 mg. of the dye were added to a highly sensitive silver bromo iodide gelatine emulsion, prepared in accordance with common practice which contains a color coupler as described in Example 5. The sensitization maximum lies at 650 millimicrons.

EXAMPLE 8

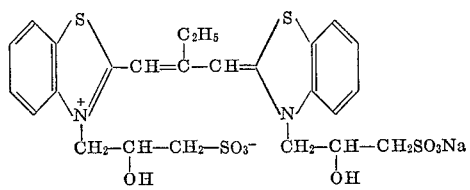

Preparation: 3 g. of the quaternary salt according to (b) are melted together with about 5 g. of phenol at 80° C. 12 cc. of pyridine and 3 cc. of ortho-propionic acid ethyl ester are added and the mixture heated for about 45 minutes in an oil bath at 130 to 135° C. The reaction mixture is poured into water, filtered and the dye is precipitated by addition of a sodium chloride solution. Thereafter it is suction-filtered and the residue recrystallized from alcohol.

EXAMPLE 9

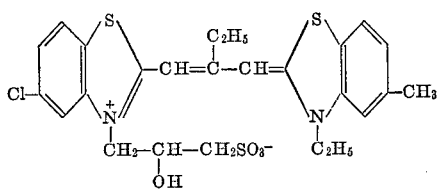

Preparation: 12 g. of 2-methyl-5-chlorobenzthiazole and 5.7 g. of chloro hydroxypropanesulfonic acid are heated for 45 minutes at 200—210° C. The reaction mixture is treated with acetone and ethanol. The quaternary salt of formula

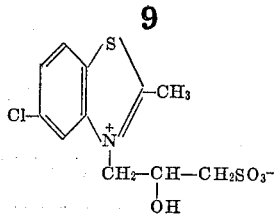

thus obtained is dissolved in 10 g. of phenol and 10 cc. of hot ethyl alcohol. To this mixture is added a solution of 3.7 g. of compound

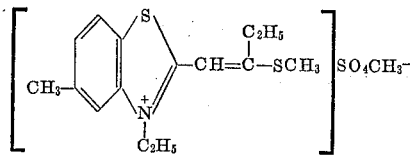

dissolved in 20 cc. of ethanol, 2.5 c. of triethylamine are added at 45° C. the crude dyestuff (3 g.) is suction-filtered after 24 hours. It is recrystallized from a mixture of 150 cc. of methanol and 200 cc. of chloroform. M.P. 295° C. Absorption maximum 560 millimicrons.

If 20 mg. of this dye are added to 1 liter of a silver halide gelatine the silver halide of which consists of silver bromide and 5 mol percent of silver iodide an extremely powerful sensitization is obtained, with a sensitization maximum at 655 millimicrons.

EXAMPLE 10

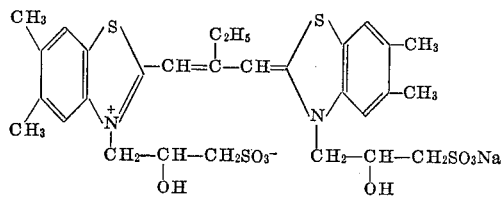

Preparation: 11 g. of the quaternary salt according to (d) are dissolved in 50 cc. of pyridine, 20 g. of phenol and 12 cc. of orthopropionic acid ethyl ester and boiled for 45 minutes. The rection mixture is poured into ether to remove pyridine and phenol. The viscous dye is dissolved in warm water after decanting the ether and the solution is filtered through glass wool. The filtrate is treated with concentrated sodium chloride solution, and the dye then precipitates in fine floccules. The crude dye is centrifuged off and recrystallized from a mixture of methanol and water. Absorption maximum: in alcohol 565 millimicrons in $H_2O$ 650, 525 millimicrons. M.P. approx. 240° C.

For sensitizing a silver bromide gelatin emulsion, 50 mg. dye are used per liter emulsion. The emulsion has a sensitization maximum at 640 millimicrons.

EXAMPLE 11

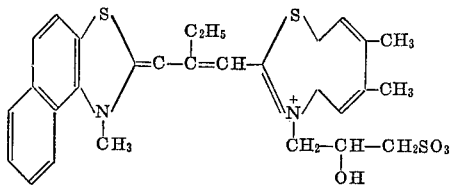

Preparation: The said dyestuff is obtained from 1 g. of the intermediate compound

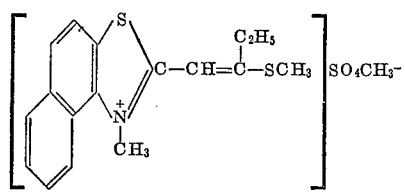

and 0.7 g. of a quaternary salt according to (d), dissolved in approximately 50 c. of hot ethanol and 1 cc. of tri-ethylamine. M.P. 230° C. Absorption maximum 580 millimicrons. Sensitization maximum 650–655 millimicrons.

I claim:
1. In a silver halide gelatine emulsion sensitized with a dye, the improvement according to which the dye has the formula:

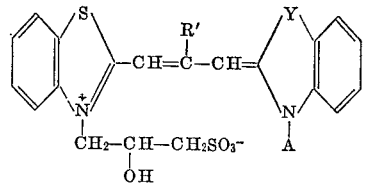

wherein
R' represents a lower alkyl;
Y stands for a member of the group consisting of sulfur and selenium;
A represents a lower alkyl radical if Y stands for selenium and represents a member of the group consisting of lower alkyl and hydroxypropylsulfonic acid if Y stands for sulfur.

2. The combination of claim 1 in which the benzene rings of the dye have at least one substituent of the group consisting of lower alkyl, lower alkoxy, halogen, phenyl, anellated phenyl, cyclohexyl, phenyl alkyl and thienyl.

3. The combination of claim 1 in which the dye has the formula

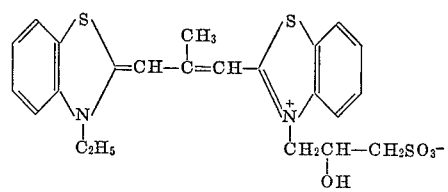

4. The combination of claim 1 in which the dye has the formula

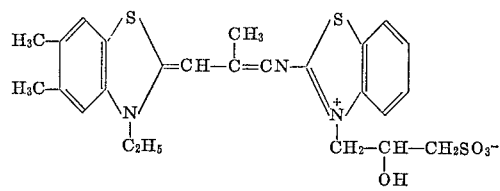

5. The combination of claim 1 in which the dye has the formula

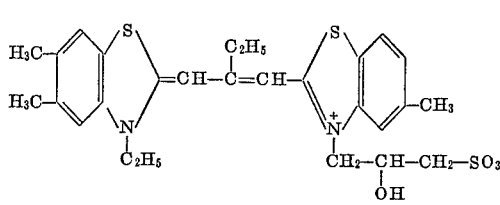

6. The combination of claim 1 in which the dye has the formula

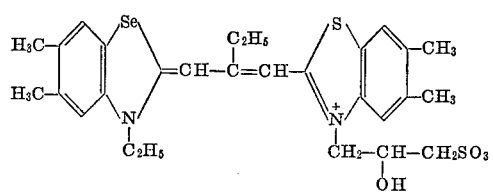

7. The combination of claim 1 in which the dye has the formula
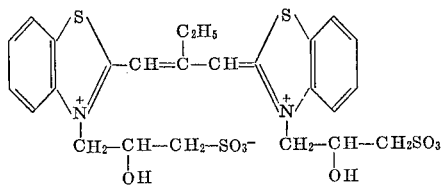
References Cited
UNITED STATES PATENTS
| | | | |
|---|---|---|---|
| 3,288,610 | 11/1966 | Gotze et al. | 96—106 |
| 3,177,210 | 4/1965 | Rosenoff | 96—106 |
| 2,895,955 | 7/1959 | Haseltine et al. | 260—240.5 |
| 2,984,664 | 5/1961 | Fry et al. | 260—240.5 |
| 2,304,981 | 12/1942 | Wilmanns | 96—106 |
| 2,870,014 | 1/1959 | Brooker et al. | 96—106 |
FOREIGN PATENTS
742,112  12/1955  Great Britain.
J. TRAVIS BROWN, *Primary Examiner.*

PO-1050
(5/69)

UNITED STATES PATENT OFFICE
CERTIFICATE OF CORRECTION

Patent No. 3,424,586                    Dated January 28, 1969

Inventor(s) Johannes Gotze

It is certified that error appears in the above-identified patent and that said Letters Patent are hereby corrected as shown below:

Column 3, line 8, (Page 5, line 13 of the application), the word "benzoxaines" should be -- benzoxazines -- .
Column 4, line 25, (Page 9, line 10 of the application), before "4.9%" -- H -- should be inserted; Column 4, line 51, (Page 10, line 4 of the application), before "4.9%" -- N should be inserted; Column 4, line 52, (Page 10, line 4 of the application), before "22.0%" -- S -- should be inserted.
Column 6, in Example 3, in the first formula, the left side of the structure should be as follows: (Page 15 of the application)

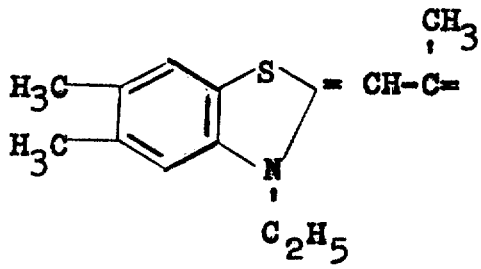

Column 7, in Example 5, in the first formula, the right side of the structure, the chain radical attached to the nitrogen should be as follows: (Page 17 of the application)

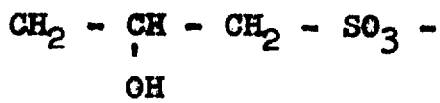

Column 7, in Example 6, in the first formula, the right side of the structure, the chain radical attached to the nitrogen should be as follows: (Page 18 of the application)

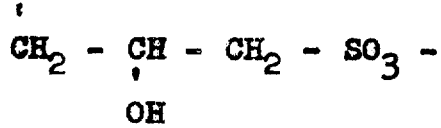

U.S. Patent 3,424,500

(2)

Column 8, in Example 7, in the first formula, the right side of the structure, the chain radical attached to the nitrogen should be as follows: (Page 19 of the application)

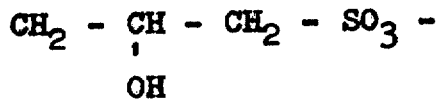

Column 9, in Example 11, in the first formula, the right side of the structure, the chain radical attached to the nitrogen should be as follows: (Page 23 of the application)

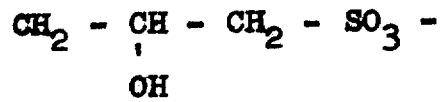

Column 10, in the formula of claim 5, the chain radical attached to the nitrogen on the right side of the structure should be as follows: (Page 25 of the application)

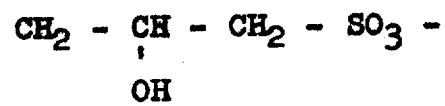

Column 10, in the formula of claim 6, the chain radical attached to the nitrogen on the right side of the structure should be as follows: (Page 25 of the application)

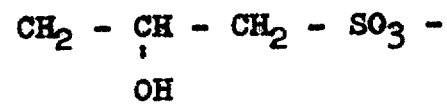

Column 11, in the formula of claim 7, the chain radical attached to the nitrogen on the right side of the structure should be as follows: (page 26 of the application)

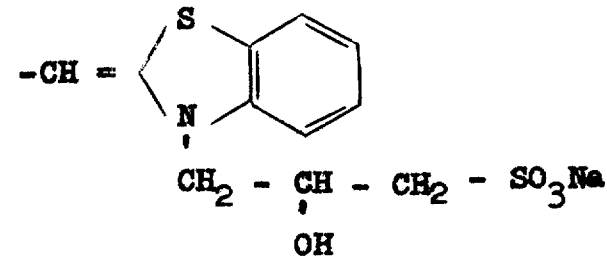

Signed and sealed this 13th day of October 1970.

(SEAL)
Attest:

Edward M. Fletcher, Jr.
Attesting Officer

WILLIAM E. SCHUYLER, JR.
Commissioner of Patents